Nov. 19, 1940.     J. S. WEATHERBEE     2,222,187
SPLIT WING FLAP FOR AIRPLANES
Filed March 11, 1939
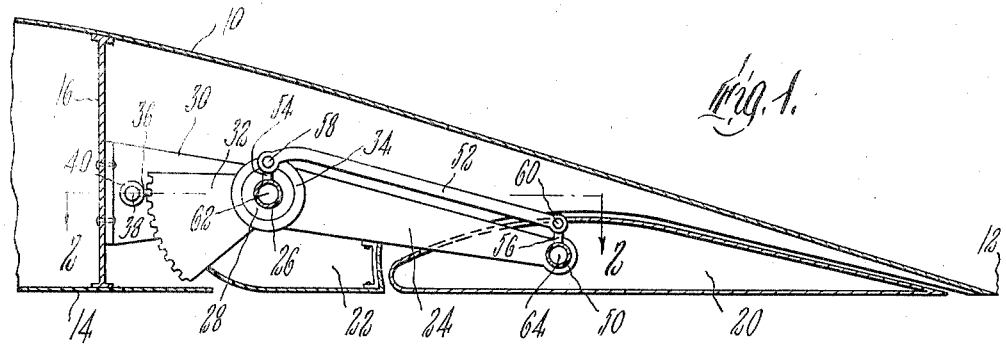
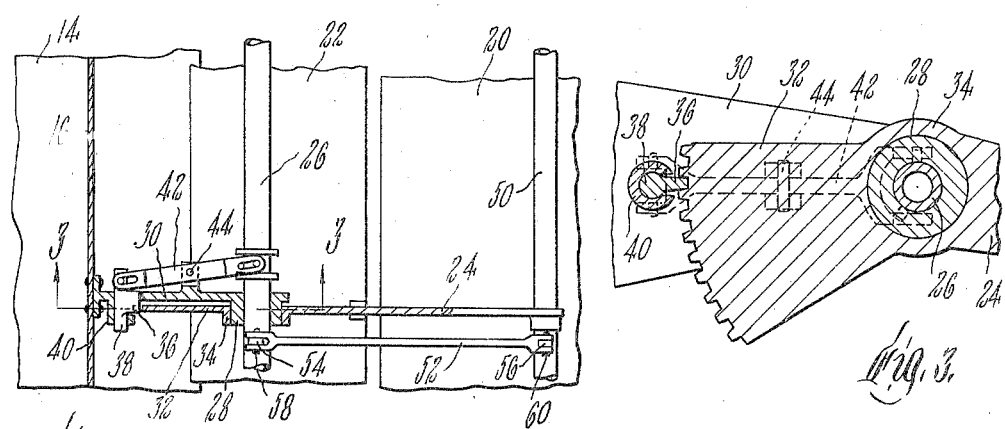
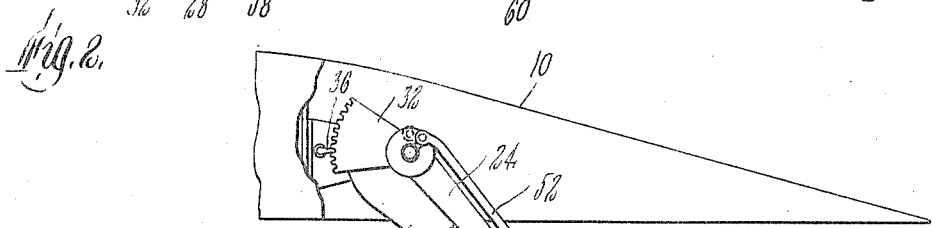
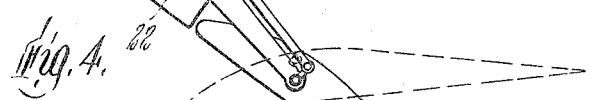
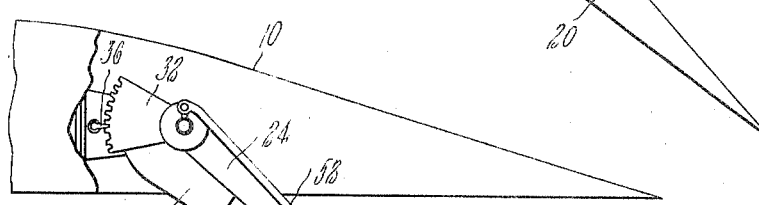
Inventor
James S. Weatherbee
by Wright, Brown, Quinby & May
Attys.

Patented Nov. 19, 1940

2,222,187

UNITED STATES PATENT OFFICE 2,222,187

SPLIT WING FLAP FOR AIRPLANES

James S. Weatherbee, Basking Ridge, N. J.

Application March 11, 1939, Serial No. 261,300

8 Claims. (Cl. 244—42)

This invention relates to airplane wing structure and more particularly to a split wing flap which extends spanwise of the wing and is disposed under the trailing portion of the top cover thereof, the bottom face of the flap normally serving as a portion of the wing itself.

An object of a flap of this kind is to assist the pilot in taking off and landing the airplane, the flap serving to increase the lift of the wing but also to increase the drag. Such drag is a detriment when the airplane is getting under way but it is of assistance in landing since it helps to check the headway of the airplane as it reaches the ground.

Various flaps of this general description have heretofore been mounted on wings but such flaps have been open to various objections. For example, a flap which interferes with continuity of the top surface of the wing results in a serious decrease in the lift of the wing. Other flaps are objectionable by reason of the complication and consequent weight of the gear required for their operation.

It is an object of the present invention to provide a flap which is disposed under the top cover of the wing so that the cover is continuous from the leading edge to the trailing edge of the wing, the flap being supported by simplified means which results in considerable economy of weight and ease of operation. As hereinafter described, the supporting mechanism is so designed that the slip stream is employed to raise and lower the flap, the tilt of the flap relative to the wing being manually controlled by suitable mechanism. By such tilting of the wing, the effect of the slip stream upon the wing is controlled. This method of controlling the flap results in a very simplified mechanism for such purpose.

For a more complete understanding of the invention, reference may be had to the description thereof which follows, and to the illustration thereof on the drawing of which Figure 1 is a fragmentary sectional view of an airplane wing and flap embodying the invention.

Figure 2 is a fragmentary section on the line 2—2 of Figure 1.

Figure 3 is a fragmentary section on the line 3—3 of Figure 2, shown on a larger scale.

Figures 4 and 5 are diagrammatic views of the trailing portion of the wing with its flap shown in different positions of operation.

As indicated in Figure 1, the wing may be of conventional shape and may include a top cover 10 extending continuously from the leading edge (not shown) to the trailing edge 12. The bottom cover 14 does not extend to the edge 12 but ends a short distance to the rear of the trailing spar 16. Disposed under the trailing portion of the top cover 10 is a flap 20 which extends spanwise of the wing and which has a chordwise section somewhat similar to that of the wing itself, as indicated in Figure 1. A spanwise fairing member 22 is located just ahead of the flap 20, the bottom faces of the fairing member and the flap serving as portions of the bottom face of the wing itself when the flap is in its normal position as shown in Figure 1.

Suitable supporting means are provided for maintaining the flap normally in its position for flight as illustrated in Figure 1 and for permitting downward movement of the flap to positions below the bottom level of the wing for the purpose of adding to the lift of the wing and at the same time of acting as a drag to reduce the speed of the airplane when making a landing. Such supporting means preferably include a series of parallel arms or links 24 which are rockable about a spanwise axis of the wing and extend rearwardly from such axis to pivot connections with the flap 20, such pivot connections being preferably in a spanwise axis in the flap located approximately at the center of pressure of the flap. In the embodiment of the invention illustrated on the drawing, the arms 24 are journaled on a wing shaft 26 which is journaled in suitable bearings 28 carried by brackets 30 secured to the trailing spar 16 so that the shaft 26 can rock in its bearings and shift longitudinally therein. The arms 24 are freely rockable on the shaft 26 but a locking means is provided for securing the arms in any angular position relative to the shaft within the permitted range of movement of the arms so that the flap 20 may thus be locked in its normal raised position or its extreme lowered position or in intermediate positions between the two. Any suitable locking apparatus, preferably actuated by longitudinal shifting movement of the shaft 26, may be employed. As illustrated, the locking means consists of a gear sector 32 extending forward from the hub 34 of each arm 24. A pawl 36 is arranged to be moved into and out of mesh with the teeth of the sector so as to lock the corresponding arm 24 against rocking movement or to release the arm for rocking movement about the shaft 26. As shown in Figure 2, this pawl may be carried by a plunger 38 slidable in a suitable boss 40 on the bracket 30. Sliding movement of the pawl 36 into and out of mesh with the gear sector 32 is caused by a connecting link 42 which is pivotally mounted as at 44 on a portion of the bracket 30, one end of the link 42 being attached to the plunger 38, the other end of the link being attached to the shaft 26 so that longitudinal shifting of the shaft 26 results in locking and unlocking movement of the pawl 36.

The fairing member 22 is secured rigidly to the arms 24, so that, when the arms 24 rock about the axis of the shaft 26, the fairing member 22 rocks with them as may be seen in Figures 1 and 4.

The rear ends of the arms 24 are pivotally attached to the flap 20. For this purpose a spanwise rod or shaft 50 may be mounted in the flap 20 so that the flap rocks with the shaft 50 about the axis of this shaft to change the angle of tilt of the flap with respect to the wing itself. In order to control the angle of tilt of the flap 20, the shaft 50 is connected to the shaft 26 by means of one or more links 52, each such link extending between a pair of radial arms 54 and 56 projecting from the shafts 26 and 50 respectively. The link 52 is pivotally attached to the arms 54 and 56 at pivot points 58 and 60 which are spaced apart a distance equal to that between the axes 62 and 64 of the shafts 26 and 50 as shown in Figure 1. The effective lengths of the arms 54 and 56 are equal, so that the points 58, 60, 62 and 64 define a parallelogram and the arm 54 is always parallel with the arm 56. Hence, if the shaft 26 is secured against rocking movement, the downward upward movement of the flap 20 does not change the angle of tilt of the flap with respect to the wing. Furthermore, it is evident that if the shaft 26 is rocked manually or by other suitable means, the shaft 50 will likewise be rocked through the same angle. Since the flap 20 is fixed on the shaft 50, the flap will rock with this shaft so that its angle of tilt can be controlled by rocking the shaft 26, this control being effective for any position of elevation of the flap.

In operating the flap, if the airplane is at rest upon the ground, release of the sectors 32 by the pawls 36 will permit the flap 20 to swing down by gravity to its lowermost position, in which position it may then be locked by shifting the shaft 26 and the pawls 36. The angle of tilt of the flap may then be adjusted by rocking the shaft 26 so as to give the flap the most effective tilt for adding lift to the wing with minimum extra drag, such a tilt being indicated in Figure 5. The flap may be retained in this position while the airplane is taking off and making its initial climb. When it has attained a sufficient altitude, the pawls 36 may be retracted to release the flap 20. Since there is an upward component of force acting thereon by reason of the slip stream, the stream will cause the flap to rise to its normal position for flight illustrated in Figure 1. The pawls 36 are then shifted to lock the flap in such position during the flight.

In approaching a landing field, the pawls 36 are retracted to release the flap 20. The flap is then tilted downward until the slip stream is caught by its upper surface, whereupon the slip stream causes the flap to descend from its recess in the wing, the descent being controlled by varying the angle of tilt of the flap as desired. When the flap has reached its lowermost position or any other desired position, it may be locked therein by shifting the pawls 36. The flap may then be tilted as indicated in Figure 4 to provide maximum lift and drag to facilitate the landing of the airplane. Since the arms 24 are attached to the flap at points near the center of pressure of the flap, the flap can be easily rocked since the wind pressure on the flap is not effective to oppose such rocking movements in any considerable degree. This use of the slip stream in raising and lowering the flap greatly simplifies and lightens the control apparatus employed for operating the flap.

The controls for rocking and shifting the shafts 26 are not shown but may be of any suitable construction as well known in the art, such controls being preferably such as to permit either unison or differential operation of the flaps as desired.

It is evident that various modifications and changes may be made in the embodiment of the invention herein shown and described without departing from the spirit or scope thereof as defined in the following claims.

I claim:

1. An airplane wing having a flap disposed under the trailing portion of the top cover thereof, the lower surface of said flap serving as a portion of the lower surface of the wing when the flap is in normal position for flight, a shaft in said wing extending spanwise thereof and longitudinally shiftable, a plurality of supporting arms journaled on said shaft and pivotally attached to said flap, locking means controlled by shifting movement of said shaft to release said arms for free rocking movement about said shaft and to lock said arms in various angular positions relative to the wing, and means for controlling the tilt of said flap relative to said wing.

2. An airplane wing having a flap normally disposed under the trailing portion of its top cover, a rockable and longitudinally shiftable operating shaft mounted in said wing, a plurality of support arms pivoted on said shaft at their forward ends and pivoted at their rear ends to said flap at points between the leading and trailing edges of the flap, means controllable by longitudinal shifting movement of said shaft to lock said support arms against rocking movement about said shaft, and means for controlling the tilt of the flap relative to the wing, said last-named means comprising a linkage connecting said flap and shaft so that said flap and shaft rock together in equal amounts about their respective axes.

3. An airplane wing having a spanwise flap normally disposed under the trailing portion of the top cover with its lower face serving as a portion of the lower face of the wing, a plurality of arms mounted in said wing to rock about a common spanwise axis and extending rearwardly from said axis, said flaps being pivotally attached to the rear ends of said arms, a gear sector on one side of said arms concentric with said axis, and a locking pawl movable into engagement with said sector to lock said arms against rocking movement.

4. An airplane wing having a flap and a fairing member forward of the flap normally disposed under the trailing portion of the top cover of the wing so that their bottom faces serve as portions of the bottom face of the wing, said flap and fairing member extending spanwise of the wing, means for supporting said flap for downward and upward movement thereof relative to said wing, said fairing member being secured to said supporting means so as to rock on a spanwise axis when the flap is lowered or raised, and means for locking said flap in raised, lowered and intermediate positions.

5. An airplane wing having a flap and a fairing member forward of the flap normally disposed under the trailing portion of the top cover of the wing so that their bottom faces serve as portions of the bottom face of the wing, said flap and fairing member extending spanwise of the wing, means for supporting said flap for downward and upward movement thereof relative to said wing, said fairing member being secured to said supporting means so as to rock on a spanwise axis when the flap is lowered or raised, means for locking said flap in raised, lowered and intermediate positions, and means for controlling the angle of tilt of the flap relative to the wing for any of said positions of the flap.

6. An airplane wing having a flap and a fairing member disposed under the trailing portion of the top cover of the wing, said flap and fairing member extending spanwise of the wing and having bottom faces serving as portions of the bottom surface of the wing when the flap is in normal position for flight, a wing shaft extending spanwise of the wing forward of the flap, a plurality of supporting arms journaled on said shaft for rocking movement thereon and extending rearwardly, said arms being pivotally attached at their rear ends to said flap near the center line of pressure thereof, said fairing member being secured to said arms to rock therewith, and means for releasably locking said arms against rocking movement about said shaft.

7. An airplane wing having a flap and a fairing member disposed under the trailing portion of the top cover of the wing, said flap and fairing member extending spanwise of the wing and having bottom faces serving as portions of the bottom surface of the wing when the flap and member are in normal position for flight, a wing shaft rockably mounted in said wing and extending spanwise thereof approximately at the center of pressure, a flap shaft in said flap extending parallel to the wing shaft, a plurality of links each extending from the wing shaft to the flap shaft and journaled on both shafts, said fairing member being secured to said links for rocking movement therewith about the axis of the wing shaft, locking means movable to release said links for free rocking movement within limits about the axis of the wing shaft, said means being movable when said links are in any angular position to lock said links against rocking movement about said wing shaft, and means for controlling the angle of tilt of the flap relative to the wing.

8. An airplane wing having a spanwise flap normally disposed under the trailing portion of the top cover with its lower face serving as a portion of the lower face of the wing, a plurality of arms mounted in said wing to rock about a common spanwise axis and extending rearwardly from said axis, said flaps being pivotally attached to the rear ends of said arms, means adjacent to each said arm to lock such arm pivotally against rocking movement, and means for simultaneously operating all of said locking means.

JAMES S. WEATHERBEE.